United States Patent [19]
Lapeyre

[11] 3,932,914
[45] Jan. 20, 1976

[54] CONDYLE HINGE BREAKING DEVICE

[75] Inventor: Fernand S. Lapeyre, New Orleans, La.

[73] Assignee: The Laitram Corporation, New Orleans, La.

[22] Filed: May 28, 1974

[21] Appl. No.: 473,939

[52] U.S. Cl. .......................... 17/71; 17/48; 99/568
[51] Int. Cl.² ........................................ A22C 29/00
[58] Field of Search ........ 17/73, 71, 48, 45; 74/575, 74/577 S, 577 M, 578; 99/573, 568

[56] References Cited
UNITED STATES PATENTS

| | | | |
|---|---|---|---|
| 1,207,076 | 12/1916 | Ramsay et al. | 74/577 M |
| 2,574,044 | 11/1951 | Lapeyre et al. | 17/73 |
| 3,423,788 | 1/1969 | Lapeyre | 17/71 |

Primary Examiner—Louis G. Mancene
Assistant Examiner—James D. Hamilton
Attorney, Agent, or Firm—Wilkinson, Mawhinney & Theibault

[57] ABSTRACT

The present disclosure is directed to a condyle hinge breaker for shrimp which have been positioned upon a support at its terminus with the condyle hinge between the fifth and sixth shell segments of the shrimp positioned immediately above the terminus of the support and a position holding means has rendered the shrimp static relative to the support with only its sixth shell segment and telson extending there beyond. At this point pressure means is applied from the dorsal toward ventral side of the shrimp causing the sixth shell segment and telson to be wrapped about and beneath the terminus breaking the condyle hinge between the fifth and sixth shell segment.

4 Claims, 5 Drawing Figures

CONDYLE HINGE BREAKING DEVICE

An object of the present invention is to provide a condyle hinge breaking device for operating upon headless-shell on shrimp which have been positioned on a shrimp support, with the 5–6 shell joint immediately above the terminus of the shrimp support as shown in FIGS. 2 and 3 of my prior U.S. Pat. No. 3,423,788.

A further object of the present invention is the provision of a condyle hinge breaking device which will when cooperating with a shrimp support and position arresting means with the 5–6 shell joint of the shrimp at the terminus of the shrimp support break the condyle hinge for providing shrimp for the market place of the character shown and described in U.S. Pat. Nos. 3,331,097, 3,423,788 and 3,324,504.

A further object of the present invention is the provision of a condyle hinge breaking device which cooperates with a shrimp positioning pawl of the type shown and described in my application entitled "SHRIMP POSITIONING PAWL" U.S. Ser. No. 460,118, filed Apr. 11, 1974 in which a pawl having a beak-like leading end performs the dual function of positioning the shrimp with its 5–6 shell joint immediately above the terminus of the shrimp support and also is the pressure means for moving the sixth shell segments and telson in the dorsal to ventral direction to insure breaking of the 5–6 condyle joint.

With the foregoing and other objects in view the invention will be more fully described hereinafter and more particularly pointed out in the appended claims.

In the drawings in which like parts are denoted by reference characters throughout the several views.

Figure 1:
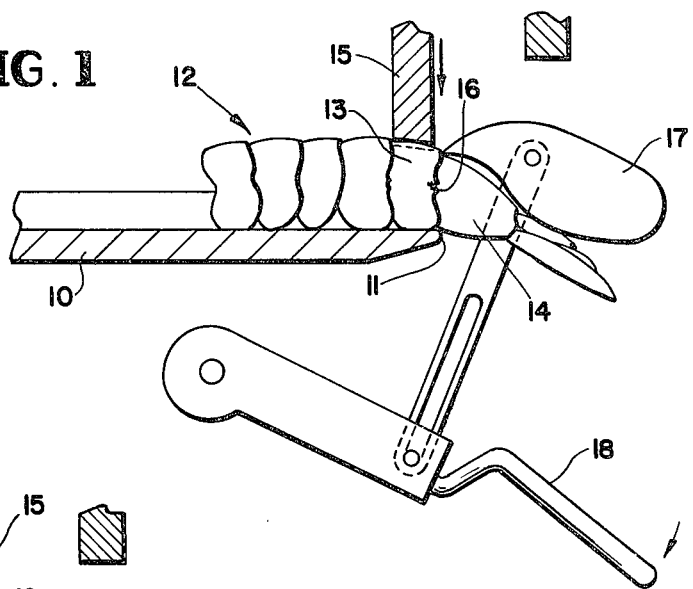
FIG. 1 is a schematic view of the condyle hinge breaking device of the present invention with a shrimp resting upon a support.
Figure 2:
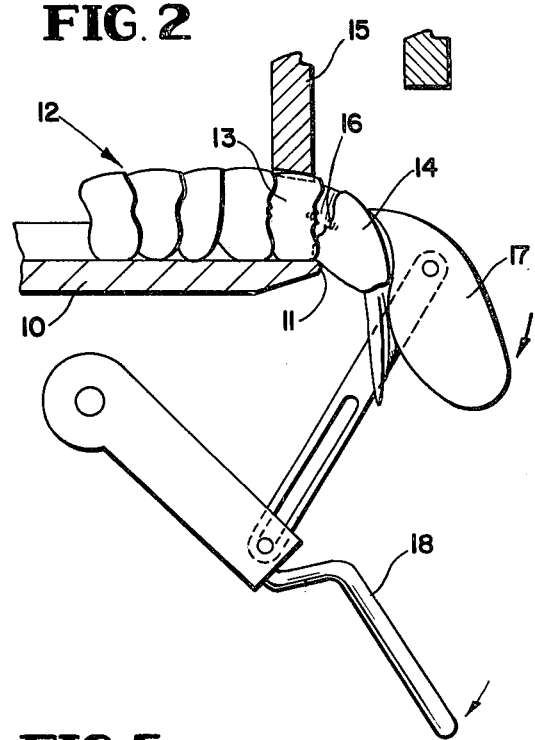
FIG. 2 is a view similar to FIG. 1 wherein the positioning pawl is moved downwardly to break the condyle hinge between shell segments 5 and 6.
Figure 5:
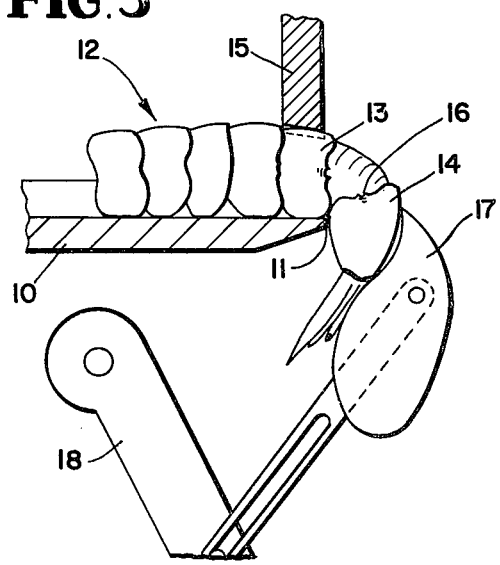
FIG. 5 is a view similar to FIG. 1, wherein the pressure means is shown in further movement wrapping the sixth shell segment under the support terminus.

Referring now to the drawings, FIGS. 1 and 2, 10 designates a shrimp support having a terminus 11 above which is positioned a shrimp 12 having its fifth-sixth shell segment joint 16 immediately above the terminus 11 of the shrimp support 10. A shrimp position means has been brought into engagement with the dorsal side of 15 has segment 13 to immobilize the shrimp 12 on the support 10 with the 5–6 condyle hinge 16 above the terminus 11 of shrimp support 10. A shrimp positioning pawl 17 having a beak-like leading end is in engagement with the sixth shell segment and telson and when moved downwardly by tines 18 in the direction of the arrows, FIGS. 1 and 2, will cause a breaking of the condyle hinge 16 between the fifth and sixth shell segments. This structure is one form of pressure means positioned relative to the sixth shell segment 14 to move the sixth shell segment around and under the terminus 11 of the shrimp support 10 in the dorsal to ventral direction to insure breaking of the condyle hinge 16 as in FIG. 5.

Figure 3:
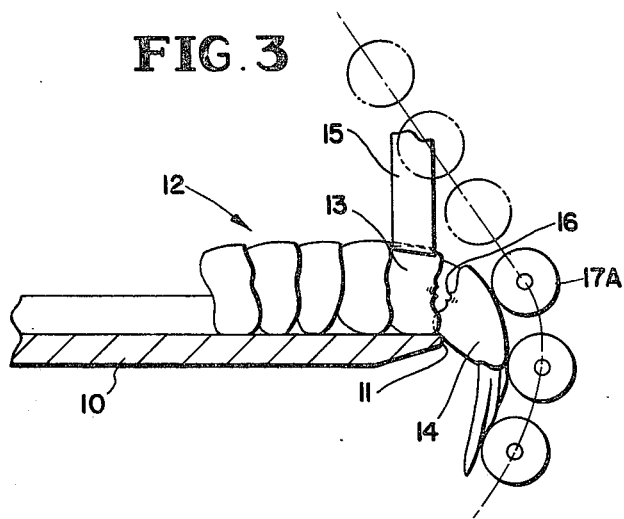
FIG. 3 is a schematic view of the condyle hinge breaking device of the present invention wherein the means for moving the sixth shell segment and telson from the dorsal to the ventral side to break the condyle hinge between shell segments 5 and 6 is a spring loaded roller shown in various states of operation.

Referring now to FIG. 3, the pressure means for moving the sixth shell segment 14 and telson from the dorsal to the ventral side of the shrimp 10 to break the condyle hinge 16 is a spring loaded roller 17A in place of the shrimp positioning pawl 17 of FIGS 1 and 2.

Figure 4:
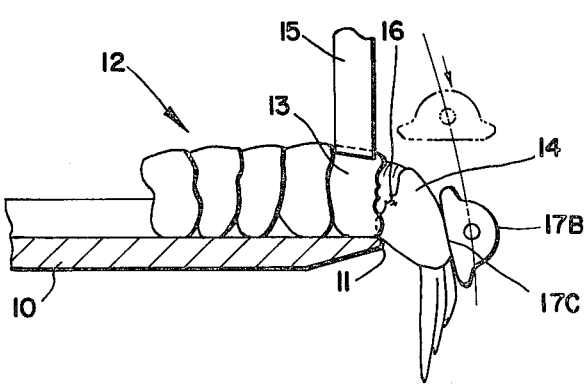
FIG. 4 is a view similar to FIG. 3 wherein the means for moving the sixth shell segment and telson from the dorsal to the ventral side of the shrimp is a member having a flat operating side in various stages of operation.

As shown in FIG. 4, the pressure means for moving the sixth shell segment 14 and telson from the dorsal to the ventral side of the shrimp 10 to break the condyle hinge 16 is a member 17B having a substantially flat operating side 17C.

In operation the shrimp 12 is located upon the support 10 with the fifth - sixth shell segment joint 16 immediately above the terminus 11 of the support 10 and the shrimp positioning means 15 is brought into engagement with the dorsal side of shell segment 13 to immobilize the shrimp relative to the support. The tines 18 are then moved clockwise as shown by the arrows causing the pressure means 17, 17A or 17B to move the sixth shell segment 14 in the dorsal to ventral direction to wrap the sixth shell segment 14 about the terminus 11 of the support 10 to break the condyle hinge 16 between the fifth shell segment 13 and sixth shell segment 14 to render the shrimp ready for peeling of only shell segments 1 through 5 leaving the sixth shell segment and telson intact with the shrimp meat for preparing same for the fantail or butterfly market place.

What I claim is:

1. A condyle hinge breaking device comprising a shrimp support upon which a shrimp is fed axially along its major axis positioned ventral side down with the joint between the 5th and 6th shell segments immediately above the terminus of the support, axial position holding means above the fifth shell segment and engagable therewith to prevent motion of the shrimp along its longitudinal axis, and pressure means positioned relative to the sixth shell segment to move the sixth shell segment in the dorsal to ventral direction and further wrap the sixth segment under the support terminus to insure breaking of the 5–6 condyle joint.

2. A condyle hinge breaking device as claimed in claim 1 wherein the pressure means is a pivoted pawl having a beak-like leading end which engages the shrimp on its dorsal side above the joint of the 5th and 6th shell segment.

3. A condyle hinge breaking device as claimed in claim 1 wherein the pressure means is a spring loaded roller.

4. A condyle hinge breaking device as claimed in claim 1 wherein the pressure means is a resiliently loaded member having a substantially flat working face.

* * * * *